(12) United States Patent
Zhong et al.

(10) Patent No.: US 8,808,419 B2
(45) Date of Patent: Aug. 19, 2014

(54) METHOD OF INTEGRATION OF CONCENTRATION-DEHYDRATION AND AEROBIC AIR-DRYING OF SEWAGE SLUDGE

(75) Inventors: Huansheng Zhong, Guangzhou (CN); Xuewei Wu, Guangzhou (CN); Jiacong Wu, Guangzhou (CN); Zhimin Sun, Guangzhou (CN); Haiying Yang, Guangzhou (CN)

(73) Assignee: Guangzhou New Extend Rising Environmental Protection Technologies Machinery Equipment Co., Ltd., Guangzhou (CN)

( * ) Notice: Subject to any disclaimer, the term of this patent is extended or adjusted under 35 U.S.C. 154(b) by 266 days.

(21) Appl. No.: 13/498,495

(22) PCT Filed: Nov. 18, 2009

(86) PCT No.: PCT/CN2009/001280
§ 371 (c)(1),
(2), (4) Date: Jun. 20, 2012

(87) PCT Pub. No.: WO2011/035460
PCT Pub. Date: Mar. 31, 2011

(65) Prior Publication Data
US 2012/0247165 A1    Oct. 4, 2012

(30) Foreign Application Priority Data

Sep. 28, 2009 (CN) .......................... 2009 1 0192762

(51) Int. Cl.
| | | |
|---|---|---|
| C05F 3/00 | (2006.01) |
| C05F 9/00 | (2006.01) |
| C05F 1/00 | (2006.01) |
| C02F 11/12 | (2006.01) |
| C02F 11/14 | (2006.01) |
| C02F 1/52 | (2006.01) |
| C02F 1/78 | (2006.01) |
| C02F 1/32 | (2006.01) |
| C02F 1/56 | (2006.01) |

(52) U.S. Cl.
CPC ............... *C02F 11/122* (2013.01); *Y02E 50/30* (2013.01); *C02F 1/5236* (2013.01); *C02F 2209/02* (2013.01); *C02F 11/14* (2013.01); *C02F 1/78* (2013.01); *C02F 1/32* (2013.01); *C02F 1/56* (2013.01); *Y02E 50/10* (2013.01)
USPC ........................... 71/12; 71/13; 71/14; 71/15

(58) Field of Classification Search
CPC .............. C05F 3/00; C05F 7/00; C02F 11/14; C02F 1/5236; C02F 1/56; C02F 11/121; C02F 11/122; C02F 1/32; C02F 1/78
USPC ........................................................ 71/11–13
See application file for complete search history.

(56) References Cited

U.S. PATENT DOCUMENTS

| | | | |
|---|---|---|---|
| 5,227,073 A | 7/1993 | Bastgen et al. | |
| 5,279,637 A | 1/1994 | Lynam et al. | |
| 2003/0084693 A1* | 5/2003 | Sower | ............... 71/11 |
| 2010/0282683 A1 | 11/2010 | Zhong | |
| 2012/0247165 A1* | 10/2012 | Zhong et al. | ...................... 71/12 |

FOREIGN PATENT DOCUMENTS

| | | |
|---|---|---|
| CA | 2711153 A1 | 7/2009 |
| CN | 2463048 Y | 12/2001 |
| CN | 1669956 A | 9/2005 |
| CN | 1986788 A | 6/2007 |
| CN | 101007695 A | 8/2007 |
| CN | 101234841 A | 8/2008 |
| JP | 59-82996 | 5/1984 |
| JP | 61-181600 | 8/1986 |
| JP | S 62-13544 | 1/1987 |
| JP | 6134500 A | 5/1994 |
| JP | H0731999 U | 6/1995 |
| JP | 2001-70995 | 3/2001 |
| JP | 2002-177983 | 6/2002 |
| JP | 2004-105835 | 4/2004 |
| JP | 2004-136262 | 5/2004 |
| JP | 2004160329 A | 6/2004 |
| JP | 2005-103397 | 4/2005 |

| JP | 2007-130545 | 5/2007 |
| JP | 2008080252 A | 4/2008 |
| WO | WO 2009 082886 | 7/2009 |

OTHER PUBLICATIONS

Supplementary European Search Report for Application EP09849648 dated Dec. 11, 2013.

\* cited by examiner

*Primary Examiner* — Jennifer A Smith

(74) *Attorney, Agent, or Firm* — Honigman Miller Schwartz and Cohn LLP

(57) ABSTRACT

A method of integration of concentration-dehydration and aerobic air-drying of sewage sludge comprises the following steps: (a) conditioning by an organic agent (3); (b) gravitationally concentrating (5) the residual sludge conditioned by the organic agent; (c) conditioning by inorganic agents (7); (d) mechanically dehydrating (8); (e) crushing and dispersing (10); and (t) aerobically air-drying (11). The method has the following advantages: (i) to improve the sedimentation performance of the residual sludge, thus improving the concentration efficiency of sludge, reducing the concentrating time and reducing the volume of the concentrating pool; (ii) to reduce the volume of the dehydrated sludge correspondingly, thus reducing the subsequent heat treatment load; (iii) to have low energy consumption for drying; (iv) the sludge granules moving at low speed during the drying process, thus being produced stably and securely without powder; (v) the dried exhaust air can reach environmental-friendly standard discharge after being washed by water; (vi) the output sludge granules are not compact, which is good for reclamation.

14 Claims, 3 Drawing Sheets

B-B

METHOD OF INTEGRATION OF CONCENTRATION-DEHYDRATION AND AEROBIC AIR-DRYING OF SEWAGE SLUDGE

TECHNICAL FIELD

This invention relates to the field of the treatment of sewage sludge, more particularly to a method of integration of concentration-dehydration and aerobic air-drying of residual sludge.

BACKGROUND OF THE INVENTION

Currently, the activated sludge process is used to treat sewage in most municipal sewage treatment plants. The organic substances, virus, bacteria and metal pollutants are transferred from sewage to activated sludge during the process. Residual sludge with a moisture content of more than 99.9% and high contents of organic matter is the mainly waste materials in sewage treatment plants. Treatment and disposal of sewage sludge are a complex problem, and restrict the construction and development of town.

According to the current methods commonly used for treating sewage sludge, the residual sludge with a moisture content of 99% is firstly emptied into a gravitationally concentrating tank. The supernatant is removed after 12-24 hours. The residual sludge is concentrated to have a moisture content of 97%. Then the concentrated sludge is chemically conditioned by cationic polyacrylamide and then emptied into a centrifugal dehydrator, a belt type dryer or a plate-and-frame filter press. The filtrate is removed, leaving the sludge having a moisture content of 80-75%. The dehydrated sludge is pre-dispersed to particles and stripes and then dried in a dryer to get the dried sludge with a moisture content of 40-30%. The dried sludge may be further landfill disposed, incinerated or reclaimed as cements, bricks, fertilizers for garden and low heat value fuels.

However, the commonly used methods for treating sludge have the following disadvantages. (1) The efficiency for the concentration of sludge is low. It takes more than 12 hours for gravitationally concentrating, leading to the huge volume of the concentrating pool and rottenness of sludge during the concentration process. (2) The efficiency for the dehydration of sludge is low. The dehydrated sludge is in huge quantity and has high moisture content. Accordingly, the quantity of moisture which is needed to evaporate in the subsequent heat treatment is huge, leading to high investment and operating costs for the heat treating equipment. (3) The dehydrated sludge with a moisture content of 80-75% is semisolid with a high viscosity and thereby hard to disperse during drying process. It is known that the sludge in the viscose phase (with a moisture content of 60-40%) has low heat and mass transferring efficiency. When drying, such sludge requires high energy consumption and is subjected to "soft core phenomenon" which is dry on surface but wet in interior.

SUMMARY OF THE INVENTION

An object of the present invention is to overcome those problems mentioned above by providing a method of integration of concentration-dehydration and aerobic air-drying of sewage sludge. This method is suitable for treating the residual sludge from sewage treatment plants, with high efficiency for the concentration and dehydration of sewage sludge, low energy consumption for drying, low pollution from tail gas, low investment and operating costs for equipments and high security.

This invention embodies as a method of integration of concentration-dehydration and aerobic air-drying of sewage sludge, including the steps of:

(1) conditioning by an organic agent. To residual sludge with a moisture content of 98-99.8%, an organic agent is added. The mixture is thoroughly agitated for 10-180 seconds to improve the sedimentation performance of the residual sludge;

(2) gravitationally concentrating the residual sludge conditioned by the organic agent. The supernatant is isolated and imported to sewage treatment equipments for post-treatment;

(3) conditioning by inorganic agents. A soluble compound containing $Fe^{3+}$ is added to the concentrated residual sludge. The mixture is agitated for 10-180 seconds to react. Then lime particles are added to the mixture. The mixture is agitated for 30-300 seconds to improve the compressibility and hydrophobicity of the sludge and to release part of cell moisture in the sludge;

(4) mechanically dehydrating. The residual sludge conditioned by the inorganic agent is forced to plate-and-frame type filtering dehydrator. The filtrate is removed and imported to sewage treatment equipments for post-treatment, obtaining the dehydrated sludge filter cakes;

(5) Crushing and dispersing. The filter cakes are crushed and dispersed into sludge particles to enlarge specific surface of sludge and improve drying efficiency.

(6) Aerobically air-drying. Dry air below 90° C. is blown into the sludge particles which are stationary, moving, or overturning to cause aerobic and exothermic reactions. The moisture in the sludge particles is evaporated under both of the external and internal heat, making the moisture content of the sludge particles below 38%.

In step (6), the sludge particles are subjected to physical sterilization or chemical sterilization. The physical sterilization or chemical sterilization may be adopted depending on the requirements for the reclamation of sludge. The physical sterilization may be UV-radiation. The chemical sterilization may be ozone disinfection, high chlorine- or high oxygen-substances disinfection. Other sterilization methods may be used.

In step (6), tail gas generated in the aerobic air-drying is discharged after being washed with water. The water for washing may be neutral or alkaline to remove erosive acidic gases generated by aerobic ferment, or may be acidic to remove potential ammonia gas. The source of the water is preferably condensed water discharged from the cool exchanger. External water resources may be used as supplementary.

After step (6), the dried sludge particles are further pulverized to meet the requirements for reclamation. The further pulverizing is accomplished with a screw crushing device by making the sludge particles compacting and rubbing with each other. The screw crushing device may have a single screw or a set of two or more screws.

The residual sludge treaded in step (1) is generated during the operation of the sewage treatment plants, having a moisture content of 98-99.8%. Cationic polyacrylamide with a molecular weight of 800-1500 is used as the organic agent and formulated into a solution with a concentration of 0.05-0.5% when adding. The mass ratio of the added polyacrylamide to sludge basing on the dry weight is 0.05-0.5%. Polyacrylamide has functions such as neutralizing electrostatic charge, adsorption and bridging, which improve the sedimentation performance of sludge to reduce the concentrating time and improve the concentration efficiency. The preferred concentration of the added polyacrylamide is 0.15%.

The gravitationally concentrating of sludge in step (2) is a spontaneous sedimentation. The time for gravitationally concentrating is 30-150 minutes. The gravitationally concentrating removes interstitial water and adsorbed water in the sludge. The gravitationally concentrated sludge has a moisture content of is 86-95%.

The soluble compound containing $Fe^{3+}$ in step (3) is preferably a solution of iron trichloride with a concentration greater than 35%. The mass ratio of the added iron trichloride to sludge basing on the dry weight is 0.3-10%, preferably 5%. The lime particles contain greater than 60% of effective calcium oxide. The mass ratio of the added calcium oxide to sludge basing on the dry weight is 3-150%. Because of their functions such as electrostatic charge neutralization, sweep flocculation, skeleton provision, improving compressibility and hydrophobicity of the sludge, and releasing part of cell moisture, the iron trichloride solution and lime particles facilitate the improvement on the dehydration efficiency of sludge and obtaining dehydrated sludge with lower moisture content. The particle size of the lime particles is equal to or more than 60 meshes.

The pressure used to force sludge in step (4) is 0.5-2.5 MPa. The plate-and-frame filter press is used for removing both capillary bound moisture and part of cell moisture in the sludge. The moisture content of sludge filter cakes is 41-69% after the dehydration.

The crushing of sludge filter cakes in step (5) is achieved in the means for crushing sludge filter cakes. The means comprise a screw, a cage, a screw driving motor and a house. The screw driving motor is connected to the screw by a connector. There are crushing blades on the screw. The screw is surrounded by the cage which is surrounded by the house. The cage is porous. Sludge filter cakes are overturned in the porous cage of the means for crushing sludge filter cakes. The sludge filter cakes are crushed via the attrition and collision therebetween. The sludge particles with a size less than those of the pores of the cage breakthrough the cage and thereby the crushing and dispersing of sludge filter cakes is accomplished.

The size of the pores in the cage is 3-30 mm. The resulting sludge particles within the range, when free settled, have a relatively small bulk density, which will facilitate gas in and out. The overturning of sludge filter cakes in the cage is driven by the screw and the blades set thereon within the stationary cage, or by the rotation of the cage itself.

The speed of overturning the sludge filter cakes in the cage is adjusted by the moisture content of sludge filter cakes and the output remand. It follows (1). The higher moisture content of sludge filter cakes is, the lower the overturning speed is; and the lower moisture content of sludge filter cakes is, the higher the overturning speed is. The principle is to minimize the destruction of the capillary channels already formed inside the sludge filter cakes by shear stress, so as to keep sludge particles in a relatively loose state and having larger specific surface area to benefit the subsequent aerobically air-drying process. (2). The higher the overturning speed is, the bigger output the means for crushing sludge filter cakes has, and the lower the overturning speed is, the smaller output the means for crushing sludge filter cakes has. Preferably, the overturning speed in the crushing and dispersing of sludge filter cakes is that the linear velocity at the outermost radial point is between 5 mm/s and 100 mm/s. The power of screw driving motor is 0-20 KW.

The dry air in step (6) is generated by the steps of: subjecting refrigerants to absorbing heat in a cold exchanger and releasing heat in a heat exchanger under the action of the compressor, and subjecting air with normal temperature extracted by an air blower to cooling to precipitate condensed water in the cold exchanger wherein the temperature for cooling is between 0° C. and 15° C. and then to raising the temperature to a range of 0° C. to 90° C. in the heat exchanger to obtain the unsaturated dry air.

The above mentioned method has the following advantages. (1) The conditioning of the residual sludge by an organic agent improves the sedimentation performance of the residual sludge, thus improving the efficiency for the concentration of sludge, reducing the concentrating time and reducing the volume of the concentrating pool; (2) The conditioning of the residual sludge by inorganic agents improves the condensability and hydrophobicity of the concentrated sludge and release part of cell moisture within the sludge. It improves the dehydration efficiency of the high pressure plate-and-frame filter dehydration to obtain sludge filter cakes with lower moisture content. The volume of dehydrated sludge is reduced correspondingly, thus reducing the subsequent heat treatment load; (3) Upon the crushing and dispersing of the sludge filter cakes before the drying step, the resulting sludge particles have a larger specific surface, which are more efficient in heat conducting and mass transferring when drying and thereby make the drying less energy consumption. (4) The crushed sludge particles' aerobically exothermic reactions further reduce the energy consumption for drying, speed up the drying speed and achieve the deodorization of sludge. (5) During the drying, the sludge particles move at a relatively slower speed, producing no dust, which makes the process more stable and safer; (6) Due to the low temperature drying of sludge, no thermal cracking reaction of organics occurs. Accordingly, the dried tail gases after washing step may meet the environment-friendly discharging standards; (7) The means for discharging and crushing has additional function of crushing, which may loosen the resulting sludge particles, making them easier for reclamation.

DESCRIPTION OF PREFERRED EMBODIMENTS

Figure 1:
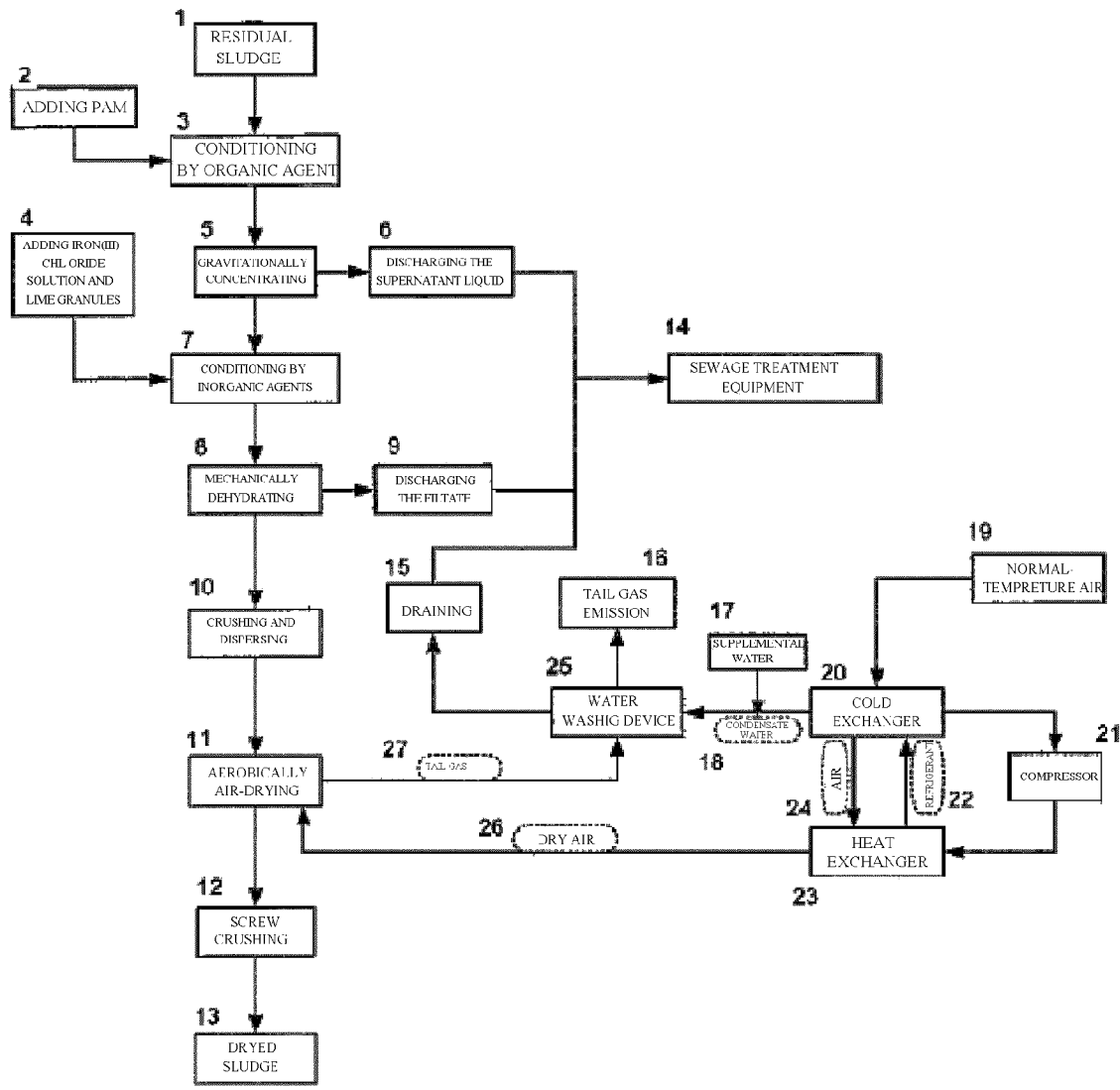
FIG. 1 is a schematic flowchart illustrating the method of integration of concentration-dehydration and aerobic air-drying of sewage sludge in accordance with this invention.
Figure 2:
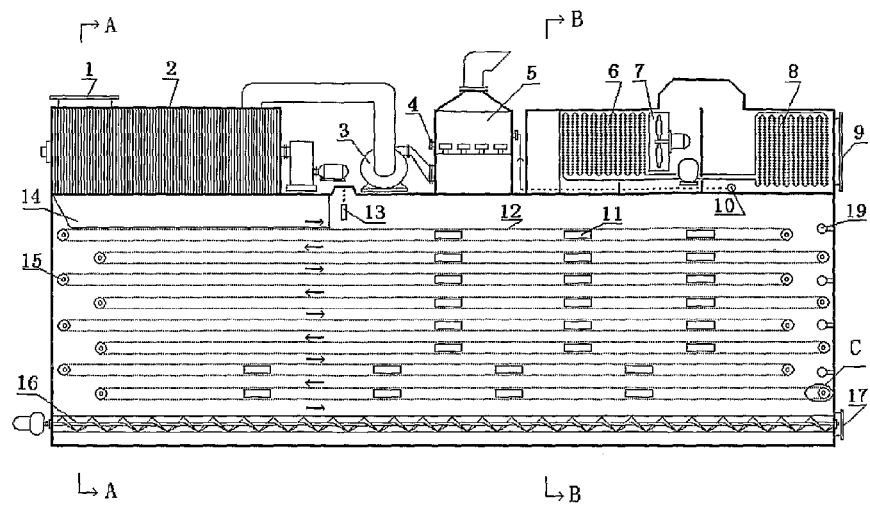
FIG. 2 is a schematic illustration of the structure of the apparatus for aerobically air-drying sludge filter cakes in accordance with this invention.
Figure 3:
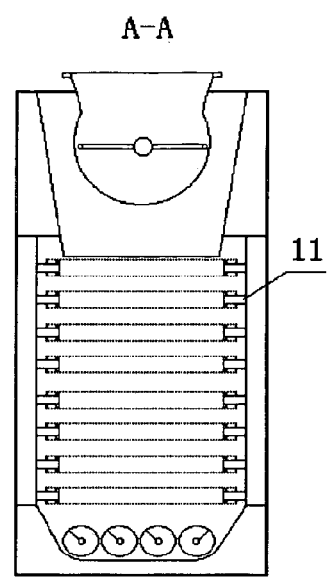
FIG. 3 is a schematic illustration of the structure of the cross section at A-A of the apparatus for aerobically air-drying sludge filter cakes in accordance with this invention.
Figure 4:
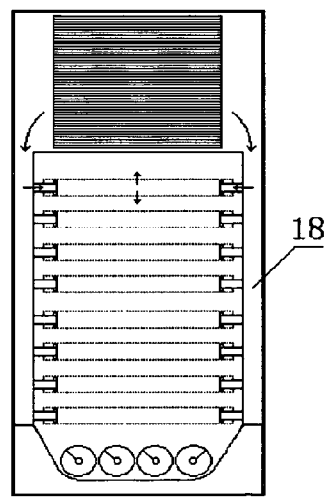
FIG. 4 is a schematic illustration of the structure of the cross section at B-B of the apparatus for aerobically air-drying sludge filter cakes in accordance with this invention.
Figure 5:
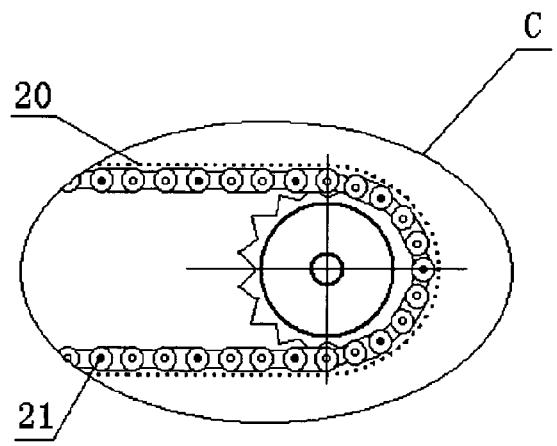
FIG. 5 is an enlarged illustration of the C section of the apparatus for aerobically air-drying sludge filter cakes in accordance with one embodiment of this invention.

This invention is described in the following section of this specification by making reference to the drawing figures and the illustrated examples.

As showed in FIG. 1, a method of integration of concentration-dehydration and aerobic air-drying of sewage sludge includes the steps of:

(1) conditioning by an organic agent. To a residual sludge with a moisture content of 98-99.8%, an organic agent is added. The mixture is thoroughly agitated for 10-180 seconds to improve the sedimentation performance of the residual sludge. The residual sludge is generated during the operation of the sewage treatment plants and has a moisture content of 98-99.8%. Cationic polyacrylamide (PAM) with a molecular weight of 800-1500 is used as the organic agent and formulated into a solution with a concentration of 0.05-0.5% when adding. The mass ratio of the added polyacrylamide to sludge basing on the dry weight is 0.05-0.5%. The preferred concentration of the added polyacrylamide solution is 0.1-02%. The preferred level of the added polyacrylamide basing on the dry weight is 0.15%. Polyacrylamide has functions such as neutralizing electrostatic charge, adsorption and bridging, which improve the sedimentation performance of sludge to reduce the concentrating time and improve the concentration efficiency.

(2) gravitationally concentrating the residual sludge conditioned by the organic agent. The supernatant is isolated and imported to a sewage treatment equipment for post-treatment. The post-treatment is the ordinary sewage treatment. The gravitationally concentrating of sludge is a spontaneous sedimentation. The time for gravitationally concentrating is 30-150 minutes. The gravitationally concentrating removes interstitial water and adsorbed water in the sludge. The moisture content of sludge is 86-95% after the gravitationally concentrating.

(3) conditioning by inorganic agents. A soluble compound containing $Fe^{3+}$ is added to the concentrated residual sludge. The mixture is agitated for 10-180 seconds to react. Then lime particles are added to the mixture. The mixture is agitated for 30-300 seconds to improve the compressibility and hydrophobicity of the sludge and to release part of cell moisture in the sludge. The soluble compound containing $Fe^{3+}$ is preferably a solution of iron trichloride with a concentration greater than 35%. The mass ratio of the added iron trichloride to sludge basing on the dry weight is 0.3-10%, preferably 5%. The level of effective calcium oxide within the lime particles is greater than 60%. The mass ratio of the added calcium oxide to sludge basing on the dry weight is 3-150%. Because of their functions such as neutralizing electrostatic charge, sweep flocculation, skeleton provision, improving compressibility and hydrophobicity of the sludge, and releasing part of cell moisture, the iron trichloride solution and lime particles facilitate the improvement on the dehydration efficiency of sludge and obtaining dehydrated sludge with lower moisture content. The particle size of the lime particles is equal to or more than 60 meshes.

(4) mechanically dehydrating. The residual sludge conditioned by the inorganic agent is forced to plate-and-frame type filtering dehydrator. The filtrate is removed and imported to sewage treatment equipment for post-treatment, leaving dehydrated sludge filter cakes. The pressure used to force sludge is 0.5-2.5 M Pa. The plate-and-frame filter press is used for removing both capillary bound moisture and part of cell moisture in the sludge. The dehydrated sludge filter cakes have a moisture content of 41-69%.

(5) crushing and dispersing. The sludge filter cakes are crushed and dispersed to sludge particles to enlarge specific surface of sludge and improve drying efficiency.

The crushing of sludge filter cakes is achieved in the means for crushing sludge filter cakes. The means comprise a screw, a cage, a screw driving motor and a house. The screw driving motor is connected to the screw by a connector. There are crushing blades on the screw. The screw is surrounded by the cage which is surrounded by the house. The cage is porous. Sludge filter cakes are overturned in the porous cage of the means for crushing sludge filter cakes. The sludge filter cakes are crushed via the attrition and collision therebetween. The sludge particles with a size less than those of the pores of the cage breakthrough the cage and thereby the crushing and dispersing of sludge filter cakes is accomplished. The speed of overturning the sludge filter cakes in the cage is that the linear velocity at the outermost radial point of the cage is between 5 mm/s and 100 mm/s. The power of screw driving motor is 0-20 KW.

The size of the pores in the cage is 3-30 mm. The resulting sludge particles within the range, when free settled, have a relatively small bulk density, which would facilitate gas in and out. The overturning of sludge filter cakes in the cage is driven by the screw and the blades thereon within the stationary cage, or by the rotation of the cage itself.

The speed of overturning the sludge filter cakes in the cage is adjusted by the moisture content of sludge filter cakes and the output remand according to the following regulars: (1). The higher moisture content of sludge filter cakes is, the lower the overturning speed is, and the lower moisture content of sludge filter cakes is, the higher the overturning speed is. The principle is to minimize the destruction of the capillary channels already formed inside the sludge filter cakes by shear stress, so as to keep sludge particles in a relatively loose state and having larger specific surface area to benefit the subsequent aerobically air-drying process. (2). The higher the overturning speed is, the bigger output the means for crushing sludge filter cakes has, and the lower the overturning speed is, the smaller output the means for crushing sludge filter cakes has.

(6) aerobically air-drying. Dry air below 90° C. is blown into the sludge particles which are stationary, moving, or overturning to cause aerobically exothermic reactions. The moisture in the sludge particles is evaporated under both of the external and internal heat. The dry air is generated by the step of: subjecting refrigerants to absorbing heat in a cold exchanger and releasing heat in a heat exchanger under the action of the compressor, and subjecting air with normal temperature extracted by an air blower to cooling to precipitate condensed water in the cold exchanger wherein the temperature for cooling is between 0° C. and 15° C. and then to raising the temperature to a range of 0° C. to 90° C. in the heat exchanger to obtain the unsaturated dry air. The sludge particles is set at a horizontal moving speed of 0-0.2 m/s or a rolling angular speed of 0-1 r/s, with power between 0-10 KW. The dry air flow rate is set at 0-20000 $m^3$/h, with power between 0-50 KW.

In step (6), the sludge particles are subjected to physical sterilization or chemical sterilization. The physical sterilization or chemical sterilization may be adopted depending on the requirements for the reclamation of sludge. The physical sterilization may be UV-radiation. The chemical sterilization may be ozone disinfection, high chlorine- or high oxygen-substances disinfection. Other sterilization methods may be used.

In step (6), tail gas generated in the aerobic air-drying is discharged after being washed with water. The washing water may be neutral or alkaline to remove erosive acidic gases generated by aerobic ferment, or may be acidic to remove potential ammonia gas. The source of the washing water is preferably condensed water discharged from the cool exchanger. External water resources may be used as supplementary.

After step (6), the dried sludge particles are further pulverized to meet the requirements for reclamation. The reclamation may be use as fertilizers, in bricks manufacture, as fuels and as fillers. The further pulverizing is accomplished with a screw crushing device by making the sludge particles impacting and rubbing with each other. The screw crushing device may have a single screw or a set of two or more screws. The transport speed of the screw is 0-10 KM/s, with power between 0-10 KW.

The step (5) and (6) is operated in an apparatus for aerobically air-drying sludge filter cakes.

The apparatus for aerobic air-drying sludge filter cakes, as showed in FIGS. (2), (3) and (4), includes the means for crushing and dispersing sludge filter cakes 2, the means for aerobically air-drying the sludge, the means for discharging and crushing, the means for producing dry air, the means for collecting and washing tail gas. The means for crushing and dispersing sludge filter cakes 2 is disposed over the means for aerobically air-drying the sludge. A feed inlet 1 for sludge filter cakes is disposed over the means for crushing and dispersing sludge filter cakes 2. In the means for crushing and dispersing sludge filter cakes 2, sludge filter cakes are crushed into sludge particles. Then the sludge particles fell down through a discharging port onto the top layer of the conveyor belt 12 within the means for aerobically air-drying the sludge. Beneath the discharging port of the means for crushing and dispersing sludge filter cakes 2, a mudguard 14 was set on the beginning of the top layer of conveyor belt 12 to make sure that all the sludge particles from the discharging port are falling onto the top layer of the conveyor belt 12. The means for crushing and dispersing sludge filter cakes 2 comprised a screw, a cage, a screw driving motor and a house. The screw driving motor is connected to the screw with a connector. There are crushing blades on the screw. The screw is surrounded by the cage which is surrounded by the house. The cage is porous. Sludge filter cakes are overturned in the porous cage of the means for crushing and dispersing sludge filter cakes. The sludge filter cakes are crushed via the attrition and collision therebetween. The sludge particles with a size less than those of the pores of the cage breakthrough the cage and thereby the crushing of sludge filter cakes is accomplished.

The means for aerobically air-drying the sludge comprises conveyor belt 12, driving device 15, sludge thickness regulator 13 and ultraviolet lamps 19. Both ends of the conveyor belt are connected to driving device 15, which drives conveyor belt 12 through an axle and a speed regulating motor. The mesh belt 20 of the conveyor belt 12 is set on chains which are linked by connecting pins 21. A sludge thickness regulator 13 is set on top of the first layer of the conveyor belt 12 to regulate the thickness of sludge particles on the conveyor belt 12, for high drying efficiency. Thickness of sludge particles is preferably controlled between 10 mm and 500 mm. Conveyor belt 12 is arranged as layers from top to bottom, for example as four or more layers. One layer of the conveyor belt moves towards the opposite direction of the adjacent layers. The conveyor belt 12 is made from any materials that are able to bear and ventilate, such as steel mesh, filter cloth and/or plastic mesh. The lower layer of the conveyor belt exceeds the upper one at one end so that sludge particles sent to the end of the upper layer of the conveyor belt fall down onto the lower one that is moving in the opposite direction. During the falling of the sludge particles, they are exposed to and sterilized by ultraviolet lamps 19 that are set on the wall opposite to the ends of each layer of the conveyor belt. The means for discharging and crushing 16 is disposed on the bottom of the means for air-drying the sludge. The discharging outlet 17 is disposed on the end of the means for discharging and crushing 16. Dried sludge particles on the bottom layer of the conveyor belt 12 fall down onto the means for discharging and crushing 16, crushed when advancing along the means for discharging and crushing 16 and discharged from the discharging outlet 17 at last. The means for discharging and crushing 16 may be a twin screw conveyor with at least one crushing screw. Preferably, the means for discharging and crushing 16 has two crushing screws.

The means for producing dry air is disposed over the means for aerobically air-drying the sludge. The means for producing dry air comprises a cold exchanger, a compressor, an air blower and a heat exchanger. Air blower 7 is between the cold exchanger 8 and the heat exchanger 6. The cold exchanger 8 is connected to the air inlet 9. Water condensed in the cold exchanger 8 is separated by a condensate separator, collected and then sent to the tail gas washing device 5 by condensed water pump 10. Through dry-air channel 18, the dry air is sent to the dry-air inlets 11 between the conveyor belts 12 to dry the sludge particles on the conveyor belt 12. Dry-air inlet 11 can blow upward and downward.

The means for collecting and washing tail gas is disposed over the means for aerobically air-drying the sludge. The means for collecting and washing tail gas includes induced draft fan 3 and tail gas washing device 5. Induced draft fan 3 connects at its air inlet to the means for crushing and dispersing sludge filter cakes 2 through the air channels and at its outlet to tail gas washing device 5 through the air channels. Washed tail gas is discharged from the exhaust pipe on the top of tail gas washing device 5, while the waste water was pumped out from overflow orifice 4 in the middle of tail gas washing device 5.

Sludge filter cakes with moisture content of 70%-50% are feed from the feed inlet 1 to the means for crushing and dispersing sludge filter cakes 2. Crushed sludge particles fall onto the steel mesh of the conveyor belt 12, whose linear velocity is set between 1 mm/s-10 mm/s. Thickness of the sludge particles on the steel mesh of the conveyor belt 12 is controlled in the range of 10 mm-500 mm by the sludge thickness regulator 13. Sludge particles sent to the end of a layer of the conveyor belt fall down onto the lower one that is moving in the opposite direction, during which falling the sludge particles are exposed to and sterilized by the ultraviolet lamps 19, which was repeated. At last the sludge falls down onto the means for discharging and crushing 16, crushed when advancing, and discharged from the discharging outlet 17 set at the end of the means for discharging and crushing 16. By adjusting the speed of the conveyor belt, residence time of sludge particles in the means for aerobically air-drying the sludge is controlled in a range of 5 h~50 h and the moisture content of the resulting materials is controlled in a range of 50%~5%.

Air with normal temperature is sent through the air inlet 9 to the cold exchanger 8 in the means for producing dry air where its moisture is condensed and separated, then pumped by air blower 7 to the heat exchanger 6 where it is warmed up and become the unsaturated dry air. The temperature of the dry air is adjusted to a range of from 0 to 90° C. Condensed water is discharged from the condensate separator in the cold exchanger 8 and then sent by the condensed water pump 10 to tail gas washing device 5 as the water source for washing. Through air channels 18, the dry air is sent to each dry air outlet 11 which is between the upper and lower steel mesh of the conveyor belt 12, to provide dried and aerobic air to the sludge particles thereon. There are several dried air outlets 11 over each layer of the conveyor belt 12. Sludge particles are subjected to a heat conducting and mass transferring with the dry air and got dehydrated. Through the induced draft fan 3, the dried tail gas is collected by the means for crushing and dispersing sludge filter cakes 2, pumped into the tail gas washing device 5 and discharged after bubbling washing. The sewage in the washing is pumped into the sewage pipe from the overflow orifice 4.

Example 1

Residual sludge with a moisture content of 99.8% was transported to the organic conditioning agitating tank. A solution of cationic polyacrylamide having a molecular weight of 12 million with a concentration of 0.1% was added to the sludge. The mass ratio of added polyacrylamide to sludge basing on the dry weight was 0.2%. Then the organic conditioned sludge was sent to the gravitationally concentrating tank. The supernatant was removed after 120 minutes of gravity concentrating. The concentrated sludge had a moisture content of 95% and was transported for the dehydration treatment.

The concentrated sludge was transported to the inorganic conditioned agitating tank. To the concentrated sludge, a solution of iron trichloride with concentration of 38% was added and the mixture was thoroughly agitated for 10 seconds. The mass ratio of the added iron trichloride to sludge basing on the dry weight was 2.3%. Then lime particles with 70% effective calcium oxide were added and the mixture was thoroughly agitated for 60 seconds. The mass ratio of the added calcium oxide to sludge basing on the dry weight was 12%. The conditioned sludge was forced to the plate-and-frame filter press by a screw pump. Injection pressure of the screw pump was 1 MPa. The filtrate was removed, leaving filter cakes with a moisture content of 61%.

Sludge filter cakes were crushed as sludge particles. The sludge particles fell to the conveyor belt and dispersed into a layer of sludge particles. The crushing of sludge filter cakes was achieved in the means for crushing and dispersing sludge filter cakes. Dry air with a temperature of 85° C. was blown with positive pressure into the layer of sludge particles which were on the slowly moved conveyor belt. The dry air was generated by subjecting air with normal temperature to moisture condensing and separating in the cool exchanger and warming up in the heat exchanger. The dry air was transported through air channels to dry air outlets which are between the upper and lower layers of the steel mesh conveyor belt. Upon crossing from the bottom and the top of sludge particles, the dry air provided oxygen for aerobic reactions as well as dehydrated the sludge particles by taking away moisture therefrom. The conveyer belt was set as layers, with sludge thickness regulator on the first layer. Thickness of sludge particles was 200 mm and the linear speed of the conveyor belt was 2 mm/s. The whole residence time of sludge particles on the conveyer belt was 20 h. The sludge particles sent to the end of the upper layer of the conveyor belt fell down onto the lower layer and moved towards the opposite direction. The falling sludge particles were subjected to physical or chemical sterilization. Tail gas which carries sludge moisture was pumped out by negative pressure from the layer of sludge particles and was discharged after being washed with water. The source of water for washing was the condensed water discharged from the cold exchanger. External water resources were used as supplementary. When sending to the end, the sludge particles on the bottom layer of the conveyor belt fell down to the spiral crushing device set below the bottom layer of the conveyor belt and were further crushed. The moisture content of the resulting sludge particles was 36%.

Example 2

Residual sludge with a moisture content of 99.5% was transported to the organic conditioning agitating tank. A solution of cationic polyacrylamide having a molecular weight of 15 million with a concentration of 0.1% was added to the sludge. The mass ratio of added polyacrylamide to sludge basing on the dry weight was 0.15%. Then the organic conditioned sludge was sent to the gravitationally concentrating tank. The supernatant was removed after 2 hours of gravity concentrating. The concentrated sludge had a moisture content of 93% and was transported for the dehydration treatment.

The concentrated sludge was transported to the inorganic conditioned agitating tank. To the concentrated sludge, a solution of iron trichloride with concentration of 38% was added and the mixture was thoroughly agitated for 2 minutes. The mass ratio of the added iron trichloride to sludge basing on the dry weight was 5.5%. The mixture were added with lime particles and thoroughly agitated for 12 minutes. The lime particles contained 72% calcium oxide. The mass ratio of the added calcium oxide to sludge basing on the dry weight was 12%. The conditioned sludge was forced to the plate-and-frame filter press by a screw pump. Injection pressure of the screw pump was 1 MPa. The filtrate was removed, leaving filter cakes with a moisture content of 58%. The sludge filter cakes were crushed as sludge particles. The sludge particles fell to the conveyor belt and dispersed into a layer of sludge particles. The crushing of sludge filter cakes was achieved in the means for crushing and dispersing sludge filter cakes. Dry air with a temperature of 60° C. was blown with positive pressure into the layer of sludge particles which were on the slowly moved conveyor belt. The dry air was generated by subjecting air with normal temperature to moisture condensing and separating in the cool exchanger and warming up in the heat exchanger. The dry air was transported through air channels to dry air outlets which are between the upper and lower layers of the steel mesh conveyor belt. Upon crossing from the bottom and the top of sludge particles, the dry air provided oxygen for aerobic reactions as well as dehydrated the sludge particles by taking away moisture therefrom. The conveyer belt was set as layers, with sludge thickness regulator on the first layer. Thickness of sludge particles was 200 mm and the linear speed of the conveyer belt was 2.5 mm/s. The whole residence time of sludge particles on the conveyer belt was 18 h. The sludge particles sent to the end of the upper layer of the conveyor belt fell down onto the lower layer and moved towards the opposite direction. The falling sludge particles were subjected to physical or chemical sterilization. Tail gas which carries sludge moisture was pumped out by negative pressure from the layer of sludge particles and was discharged after being washed with water. The source of water for washing was the condensed water discharged from the cold exchanger. External water resources were used as supplementary. When sending to the end, the sludge particles on the bottom layer of the conveyor belt fell down to the spiral crushing device set below the bottom layer of the conveyor belt and were further crushed. The moisture content of the resulting sludge particles was 34%.

Example 3

Residual sludge with a moisture content of 99.3% was transported to the organic conditioning agitating tank. A solution of cationic polyacrylamide having a molecular weight of 12 million with a concentration of 0.1% was added to the sludge. The mass ratio of added polyacrylamide to sludge basing on the dry weight was 0.1%. Then the organic conditioned sludge was sent to the gravitationally concentrating tank. The supernatant was removed after 1 hour of gravity concentrating. The concentrated sludge had a moisture content of 93% and was transported for the dehydration treatment.

The concentrated sludge was transported to the inorganic conditioned agitating tank. To the concentrated sludge, a solution of iron trichloride with concentration of 38% was added and the mixture was thoroughly agitated for 1 minute. The mass ratio of the added iron trichloride to sludge basing on the dry weight was 4.5%. Then lime particles with 75% effective calcium oxide were added and the mixture was thoroughly agitated for 15 minutes. The mass ratio of the added calcium oxide to sludge basing on the dry weight was 15.5%. The conditioned sludge was forced to the plate-and-frame filter press by a screw pump. Injection pressure of the screw pump was 1 MPa. The filtrate was removed, leaving filter cakes with a moisture content of 53%.

The sludge filter cakes were crushed as sludge particles. The sludge particles fell to the conveyor belt and dispersed into a layer of sludge particles. The crushing of sludge filter cakes was achieved in the means for crushing and dispersing sludge filter cakes. Dry air with a temperature of 48° C. was blown with positive pressure into the layer of sludge particles which were on the slowly moved conveyor belt. The dry air was generated by subjecting air with normal temperature to moisture condensing and separating in the cool exchanger and warming up in the heat exchanger. The dry air was transported through air channels to dry air outlets which are between the upper and lower layers of the steel mesh conveyor belt. Upon crossing from the bottom and the top of sludge particles, the dry air provided oxygen for aerobic reactions as well as dehydrated the sludge particles by taking away moisture therefrom. The conveyer belt was set as layers, with sludge thickness regulator on the first layer. Thickness of sludge particles was 200 mm and the linear speed of the conveyer belt was 1.5 mm/s. The whole residence time of sludge particles on the conveyor belt was 25 h. The sludge particles sent to the end of the upper layer of the conveyor belt fell down onto the lower layer and moved towards the opposite direction. The falling sludge particles were subjected to physical or chemical sterilization. Tail gas which carries sludge moisture was pumped out by negative pressure from the layer of sludge particles and was discharged after being washed with water. The source of water for washing was the condensed water discharged from the cold exchanger. External water resources were used as supplementary. When sending to the end, the sludge particles on the bottom layer of the conveyor belt fell down to the spiral crushing device set below the bottom layer of the conveyor belt and were further crushed. The moisture content of the resulting sludge particles was 33%.

Example 4

Residual sludge with a moisture content of 99% was transported to the organic conditioning agitating tank. A solution of cationic polyacrylamide having a molecular weight of 10 million with a concentration of 0.1% was added to the sludge. The mass ratio of added polyacrylamide to sludge basing on the dry weight was 0.08%. Then the organic conditioned sludge was sent to the gravitationally concentrating tank. The supernatant was removed after 1.5 hours of gravity concentrating. The concentrated sludge had a moisture content of 90% and was transported for the dehydration treatment.

The concentrated sludge was transported to the inorganic conditioned agitating tank. To the concentrated sludge, a solution of iron trichloride with concentration of 38.8% was added and the mixture was thoroughly agitated for 30 seconds. The mass ratio of the added iron trichloride to sludge basing on the dry weight was 6.5%. Then lime particles with 70% effective calcium oxide were added and the mixture was thoroughly agitated for 10 minutes. The mass ratio of the added calcium oxide to sludge basing on the dry weight was 8.4%. The conditioned sludge was forced to the plate-and-frame filter press by a screw pump. Injection pressure of the screw pump was 1 MPa. The filtrate was removed, leaving filter cakes with a moisture content of 51%.

Sludge filter cakes were crushed as sludge particles. The sludge particles fell to the conveyor belt and dispersed into a layer of sludge particles. The crushing of sludge filter cakes was achieved in the means for crushing and dispersing sludge filter cakes. Dry air with a temperature of 25° C. was blown with positive pressure into the layer of sludge particles which were on the slowly moved conveyor belt. The dry air was generated by subjecting air with normal temperature to moisture condensing and separating in the cool exchanger and warming up in the heat exchanger. The dry air was transported through air channels to dry air outlets which are between the upper and lower layers of the steel mesh conveyor belt. Upon crossing from the bottom and the top of sludge particles, the dry air provided oxygen for aerobic reactions as well as dehydrated the sludge particles by taking away moisture therefrom. The conveyer belt was set as layers, with sludge thickness regulator on the first layer. Thickness of sludge particles was 200 mm and the linear speed of the conveyer belt was 0.2 mm/s. The whole residence time of sludge particles on the conveyor belt was 45 h. The sludge particles sent to the end of the upper layer of the conveyor belt fell down onto the lower layer and moved towards the opposite direction. The falling sludge particles were subjected to physical or chemical sterilization. Tail gas which carries sludge moisture was pumped out by negative pressure from the layer of sludge particles and was discharged after being washed with water. The source of water for washing was the condensed water discharged from the cold exchanger. External water resources were used as supplementary. When sending to the end, the sludge particles on the bottom layer of the conveyor belt fell down to the spiral crushing device set below the bottom layer of the conveyor belt and were further crushed. The moisture content of the resulting sludge particles was 31%.

The invention claimed is:

1. A method of integration of concentration-dehydration and aerobic air-drying of sewage sludge, characterized in comprising the steps of:
   (1) conditioning by an organic agent: adding an organic agent into a residual sludge with a moisture content of 98-99.8% to obtain a mixture, and thoroughly agitating the mixture for 10-180 seconds;
   (2) gravitationally concentrating the residual sludge conditioned by the organic agent, with the supernatant being isolated and imported to sewage treatment equipments for post-treatment;
   (3) conditioning by inorganic agents: adding a soluble compound containing $Fe^{3+}$ into the concentrated residual sludge to obtain a mixture, agitating the mixture for 10-180 seconds, further adding lime particles, and further agitating for 30-300 seconds;
   (4) mechanically dehydrating: forcing the residual sludge conditioned by the inorganic agent to plate-and-frame type filtering dehydrator, removing the filtrate and obtaining dehydrated sludge filter cakes;
   (5) crushing and dispersing: crushing and dispersing the filter cakes into sludge particles;

(6) aerobically air-drying: blowing dry air into the sludge particles which are stationary, moving, or overturning to cause aerobically exothermic reactions.

2. The method of integration of concentration-dehydration and aerobic air-drying of sewage sludge according to claim 1, characterized in that: in step (6), the sludge particles are subjected to physical sterilization or chemical sterilization, wherein the physical sterilization is UV-radiation and the chemical sterilization is ozone disinfection, high chlorine- or high oxygen- substances disinfection.

3. The method of integration of concentration-dehydration and aerobic air-drying of sewage sludge according to claim 1, characterized in that: in step (6), tail gas generated in the aerobic air-drying is discharged after being washed with water.

4. The method of integration of concentration-dehydration and aerobic air-drying of sewage sludge according to claim 1, characterized in that: after step (6), the dried sludge particles are further pulverized.

5. The method of integration of concentration-dehydration and aerobic air-drying of sewage sludge according to claim 4, characterized in that: the further pulverizing is accomplished with a screw crushing device by making the sludge particles compacting and rubbing with each other, wherein the screw crushing device has a single screw or a set of two or more screws.

6. The method of integration of concentration-dehydration and aerobic air-drying of sewage sludge according to claim 1, characterized in that: cationic polyacrylamide is used as the organic agent added in step (1) and formulated into a solution with a concentration of 0.05-0.5% when adding, wherein the mass ratio of the added polyacrylamide to sludge basing on the dry weight is 0.05-0.5%.

7. The method of integration of concentration-dehydration and aerobic air-drying of sewage sludge according to claim 1, characterized in that: the gravitationally concentrating of sludge in step (2) is a spontaneous sedimentation wherein the time for gravitationally concentrating is 30-150 minutes and the gravitationally concentrated sludge has a moisture content of is 86-95%.

8. The method of integration of concentration-dehydration and aerobic air-drying of sewage sludge according to claim 1, characterized in that: the soluble compound containing $Fe^{3+}$ in step (3) is a solution of iron trichloride with a concentration greater than 35%, wherein the mass ratio of the added iron trichloride to sludge basing on the dry weight is 0.3-10%, wherein the lime particles contain greater than 60% of effective calcium oxide and wherein the mass ratio of the added calcium oxide to sludge basing on the dry weight is 3-150%.

9. The method of integration of concentration-dehydration and aerobic air-drying of sewage sludge according to claim 8, characterized in that: the particle size of the lime particles is equal to or more than 60 meshes.

10. The method of integration of concentration-dehydration and aerobic air-drying of sewage sludge according to claim 1, characterized in that: the pressure used to force sludge in step (4) is 0.5-2.5 MPa, and the moisture content of sludge filter cakes is 41-69% after the dehydration.

11. The method of integration of concentration-dehydration and aerobic air-drying of sewage sludge according to claim 1, characterized in that: the crushing of sludge filter cakes in step (5) is achieved in the means for crushing sludge filter cakes, wherein the means for crushing sludge filter cakes comprise a screw, a cage, a screw driving motor and a house, wherein the screw driving motor is connected to the screw by a connector, wherein there are crushing blades on the screw, wherein the screw is surrounded by the cage which is surrounded by the house, wherein the cage is porous, wherein sludge filter cakes are overturned in the porous cage of the means for crushing sludge filter cakes and are crushed via the attrition and collision therebetween, and wherein the sludge particles with a size less than those of the pores of the cage breakthrough the cage and thereby the crushing and dispersing of sludge filter cakes is accomplished.

12. The method of integration of concentration-dehydration and aerobic air-drying of sewage sludge according to claim 11, characterized in that: the size of the pores in the cage is 3-30 mm.

13. The method of integration of concentration-dehydration and aerobic air-drying of sewage sludge according to claim 1, characterized in that: the dry air in step (6) is generated by the steps of: subjecting refrigerants to absorbing heat in a cold exchanger and releasing heat in a heat exchanger under the action of a compressor, and subjecting air with normal temperature extracted by an air blower to cooling to precipitate condensed water in the cold exchanger wherein the temperature for cooling is between 0° C. and 15° C. and then to raising the temperature to a range of 0° C. to 90° C. in the heat exchanger to obtain unsaturated dry air.

14. The method of integration of concentration-dehydration and aerobic air-drying of sewage sludge according to claim 13, characterized in that: the water for washing is neutral or alkaline or acidic and the source of the water is the condensed water discharged from the cold exchanger with external water resources being used as supplementary.

* * * * *